US011409530B2

(12) United States Patent
Dunham et al.

(10) Patent No.: US 11,409,530 B2
(45) Date of Patent: Aug. 9, 2022

(54) SYSTEM, METHOD AND APPARATUS FOR EXECUTING INSTRUCTIONS

(71) Applicant: Arm Limited, Cambridge (GB)

(72) Inventors: Curtis Glenn Dunham, Austin, TX (US); Pavel Shamis, Austin, TX (US); Jamshed Jalal, Austin, TX (US); Michael Filippo, Driftwood, TX (US)

(73) Assignee: Arm Limited, Cambridge (GB)

( * ) Notice: Subject to any disclaimer, the term of this patent is extended or adjusted under 35 U.S.C. 154(b) by 26 days.

(21) Appl. No.: 16/103,995

(22) Filed: Aug. 16, 2018

(65) Prior Publication Data

US 2020/0057640 A1 Feb. 20, 2020

(51) Int. Cl.
*G06F 15/00* (2006.01)
*G06F 9/30* (2018.01)

(52) U.S. Cl.
CPC ........ *G06F 9/30185* (2013.01); *G06F 9/3004* (2013.01)

(58) Field of Classification Search
CPC ............................ G06F 9/30185; G06F 9/3004
USPC ......................................................... 712/214
See application file for complete search history.

(56) References Cited

U.S. PATENT DOCUMENTS

| | | | | |
|---|---|---|---|---|
| 5,721,924 A | * | 2/1998 | Kitadate | G06F 11/3624 714/E11.209 |
| 6,813,704 B1 | * | 11/2004 | Nguyen | G06F 9/3013 712/214 |
| 2009/0172359 A1 | * | 7/2009 | Shen | G06F 9/3842 712/215 |
| 2012/0198214 A1 | * | 8/2012 | Gadre | G06F 9/3004 712/225 |
| 2012/0216020 A1 | * | 8/2012 | Olson | G06F 9/3851 712/205 |
| 2014/0089589 A1 | * | 3/2014 | Meier | G06F 9/3838 711/125 |
| 2015/0026442 A1 | * | 1/2015 | Giroux | G06F 9/3836 712/233 |
| 2015/0169358 A1 | * | 6/2015 | Busaba | G06F 8/443 711/150 |
| 2016/0313997 A1 | | 10/2016 | Gschwind et al. | |
| 2018/0069767 A1 | * | 3/2018 | Basu | G06F 12/0828 |

* cited by examiner

*Primary Examiner* — Chun Kuan Lee
(74) *Attorney, Agent, or Firm* — Leveque Intellectual Property Law, P.C.

(57) ABSTRACT

A system, apparatus and method for ordering a sequence of processing transactions. The method includes accessing, from a memory, a program sequence of operations that are to be executed. Instructions are received, some of them having an identifier, or mnemonic, that is used to distinguish those identified operations from other operations that do not have an identifier, or mnemonic. The mnemonic indicates a distribution of the execution of the program sequence of operations. The program sequence of operations is grouped based on the mnemonic such that certain operations are separated from other operations.

17 Claims, 6 Drawing Sheets

SYSTEM, METHOD AND APPARATUS FOR EXECUTING INSTRUCTIONS

BACKGROUND

In many instruction execution systems, it is desirable to coalesce memory access. However, while memory coalescing typically has certain efficiency advantages, in certain cases, instructions are grouped such that efforts to coalesce are undesirable.

As computing systems are advancing, some existing barrier instruction techniques that restrict memory access have been developed to prevent undesired memory access. Typically existing barrier instruction techniques attempt to accomplish ordering of instructions by enforcing memory ordering, but such enforcement can be needlessly slow and unduly burdensome to device memory. Attempting to change the memory system to participate in the semantics of the existing barriers is untenably difficult and unjustifiable. Furthermore, existing barriers, which are used for I/O memory accesses have deleterious performance effects since it results in a stall or delay of the pipeline while waiting for an acknowledgement from a connection between a processor and a memory e.g., the PCI root complex.

BRIEF DESCRIPTION OF THE DRAWINGS

The accompanying drawings provide visual representations, which will be used to more fully describe various representative embodiments and can be used by those skilled in the art to better understand the representative embodiments disclosed and their inherent advantages. In these drawings, like reference numerals identify corresponding elements.

DETAILED DESCRIPTION

While this disclosure is susceptible of embodiment in many different forms, there is shown in the drawings and will herein be described in detail specific embodiments, with the understanding that the present disclosure is to be considered as an example of the principles described and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprise", "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, operations or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The following terms may be used in this description of various embodiments of the present disclosure.

Auxiliary: additional, supplemental.

Barrier instruction: an instruction that causes a CPU or compiler to enforce an ordering constraint on memory operations issued prior to and after the instruction.

Buffer: a temporary storage area, usually in RAM. The purpose of most buffers is to act as a holding area, enabling the CPU to manipulate data before transferring it to a device.

Cache: Cache memory, also called CPU memory, is random access memory (RAM) that a computer microprocessor can access more quickly than it can access regular RAM. This memory is typically integrated directly with the CPU chip or placed on a separate chip that has a separate bus interconnect with the CPU. Cache memory is a small-sized type of volatile computer memory that provides high-speed data access to a processor and stores frequently used computer programs, applications and data. It stores and retains data only until a computer is powered up.

Coalescing: merging two instructions of a similar type. Coalescing can be done as soon as there are two similar instructions to be executed, blocks are freed, or coalescing can be deferred until some later time (known as deferred coalescing), or it might not be done at all.

CPU: central processing unit; the electronic circuitry within a computer that carries out the instructions of a computer program by performing the basic arithmetic, logical, control and input/output (I/O) operations specified by the instructions.

Execution: the basic operational process of a computer. It is the process by which a computer retrieves a program instruction from its memory, determines what actions the instruction dictates, and carries out those actions. This cycle is repeated continuously by the central processing unit (CPU), from boot-up to when the computer is shut down.

Flowchart: a type of diagram that represents an algorithm, workflow or process. The flowchart shows the operations or actions of a method as boxes of various kinds, and their order.

Granularity: the extent to which a system contains separate components (like granules). The more components in a system—or the greater the granularity—the more flexible it is.

Interface: either a hardware connection or a user interface. An interface can also be used as a verb, describing how two devices connect to each other. A hardware interface is used to connect two or more electronic devices together.

Load Queue: a sequence of work objects that are waiting to be processed.

Metadata: additional data, typically summarizes basic information about data, which can make finding and working with particular instances of data easier.

Micro-architectural: computer organization, the way a given instruction set architecture (ISA), is implemented in a particular processor.

Mnemonic: name or identifier or code that is shorter in length but provides the same functionality as the original function.

I/O: input/output, the transfer of data between a processor and a peripheral device in a data processing system. I/O devices may include keyboards, displays, pointing devices, etc. that can be coupled either directly or through intervening I/O controllers.

Module: a component or part of a program or device that can contain hardware or software, or a combination of hardware and software. In a module that includes software, the software may contain one or more routines, or subroutines. One or more modules can make up a program and/or device.

Monotonically: ordering scheme between ordered sets that preserves or reverses the given order.

Operation: a single action performed by a computer in the execution of a program.

Ordering tag: kind of metadata that helps describe an item and allows it to be found again by browsing or searching.

Peripheral: a computer device, such as a keyboard or printer, which is not part of the essential computer (i.e., the memory and microprocessor). These auxiliary devices are typically intended to be connected to the computer.

Source Code: any collection of code, possibly with comments, written using human readable programming language, usually as plain text. The source code of a program is specially designed to facilitate the work of computer programmers, who specify the actions to be performed by a computer mostly by writing source code. The source code is often transformed by an assembler or compiler, into binary machine code understood by the computer. The machine code might then be stored for execution at a later time. Alternatively, source code may be interpreted and thus immediately executed.

Store Queue: sequence of work objects that are being stored.

An embodiment of this disclosure utilizes a memory location, which stores operations. A new instruction, which has a mnemonic "SEP" (for Separate), is received at the memory location. The behavior of this instruction is to prevent memory accesses before the instruction in the program order, or program sequence, from being combined with memory accesses after the instruction.

While in some commodity CPU architectures, memory coalescing behaviors are micro-architectural, i.e. not exposed to the programming interface, some control over the memory and instructions may be helpful for efficient communication with I/O devices. This gives some measure of control over the program sequence, or instruction sequence, of execution and allows an order of magnitude reduction in latency and does not induce any pipeline stalls. The embodiments described herein are particularly useful because of a significant improvement in performance with minimal implementation modifications and without modifications to the memory system.

Embodiments of this disclosure present a barrier instruction technique to separate memory operations based on efficiency of coalescing some memory operations or inhibiting coalescing of some memory operations.

This barrier instruction with a mnemonic (separate, or "SEP") is implemented by designating the existence of a stage after the "execution" of memory operations where memory interactions are buffered and possibly coalesced. The stage is designated as memory stage ("MEM"). Indeed, the stage memory, or MEM, may be architectural, micro-architectural, or non-architectural, depending on the memory model. For example, an architectural embodiment may be used for Total Store Ordering. A non-architectural embodiment may be used for other ordering models.

In any of architectural, micro-architectural, or non-architectural embodiments, the barrier instruction with the mnemonic, which could be identified as separation, or "SEP", may be enforced by assigning to each memory operation a metadata value. The metadata may be a phase color or ordering tag, or unsigned integer, or other suitable tag, identifier, or indicator.

In one embodiment, the mnemonic SEP increments a monotonically increasing counter that is used to assign order tags to memory operations. SEP itself does not perform any memory function. As such, this tag can be applied as early as immediately subsequent to the decode stage, thus not prejudicing potential out-of-order memory operations (i.e., the SEP mnemonic does not enforce ordering, so multiple memory operations after the SEP could execute and be coalesced before the SEP is committed). In such an embodiment, the MEM stage only coalesces memory operations of the same metadata tag, thus satisfying the desired semantics, but the mnemonic SEP does not need to generate micro-ops, be renamed, issued, or executed.

This concept can be extended by one or more operands that restrict which memory operations are affected by the instruction, for instance only write/store instructions.

Additionally, another embodiment disclosed herein is memory operations, such as a "WRITE" operation, or other operation to memory. In this embodiment a programmer has control to stop execution at the memory stream. This may be implemented in the CPU by using a memory phase identifier that increases by "1" every time there is a command. Only operations that share the same identifier are combined.

Figure 1:
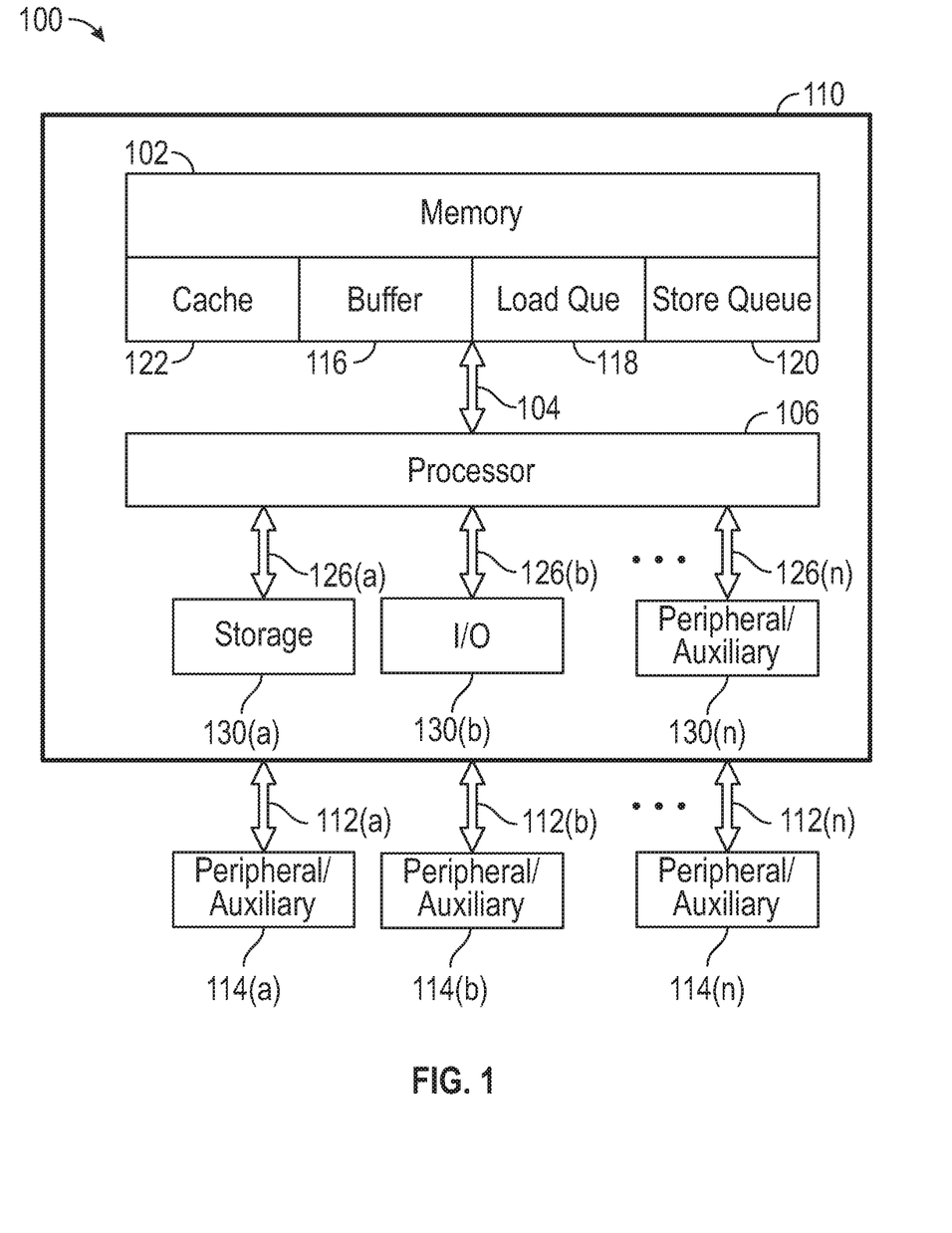
FIG. 1 illustrates a block diagram of a system according to the disclosure.

FIG. 1 illustrates a system 100 that includes a first module 110 operatively coupled, via bi-directional communication busses, 112(*a*) . . . (*n*) (where "n" is any suitable number that comports with system 100), to various peripheral/auxiliary modules 114(*a*) . . . (*n*) (where "n" is any suitable number that comports with system 100). Each of these elements is described in more detail herein.

Module 110 includes memory 102 operatively coupled to processor 106, via interface 104. Processor 104 is operatively coupled to storage module 130(a), I/O module 130(b) and peripheral/auxiliary module 130(n), via associated interfaces 126(a), (b) . . . (n), respectively, where "n" is any suitable number.

Memory module 102 is coupled to or includes additional memory locations or memory modules that include, for example: buffer 116; load queue 118; store queue 120; and cache memory 122. While four supplemental memory modules 116, 118, 120 and 122 are shown, any suitable number of supplementary memory modules may be used.

Buffer module 116 may be used to buffer various instructions received at memory module 102. The buffer 116 acts as a holding area, enabling the CPU to manipulate data before transferring it to a module or device.

Load queue module 118 is used to store instructions that are to be executed.

Store queue 120 is used to store instructions that can be accessed and processed.

Memory module 102 is operatively coupled to processor 106 via interface 104 and may utilize the memory modules 122, 116, 118 and 120. Interface 104 may be any suitable interface, for example an AXI interface, which is an interface developed by ARM® Incorporated. The interface 104 provides a hardware interface to connect the memory module 102 and processor 106 so that information and data and communication and control signals can be exchanged.

Processor module 106, may be any suitable processor with a CPU having adequate processing capability to perform ordering based on models, or rules, or algorithms, which may be stored in a memory, such as cache memory or accessed from remote storage by processor module 106. The processor module 106 is capable of storing instructions, code, algorithms, models and other operating and execution parameters.

As used herein the term "processor" may encompass or make use of programmable hardware such as: computers, microcontrollers, embedded microcontrollers, microprocessors, application-specific integrated circuits (ASICs), field-programmable gate arrays (FPGAs), and complex programmable logic devices (CPLDs). These hardware examples may further be used in combination to achieve a desired functional controller module. Computers, microcontrollers and microprocessors may be programmed using languages such as assembly, C, C++, C #, or the like. FPGAs, ASICs and CPLDs are often programmed using hardware description languages (HDL) such as VHSIC hardware description language (VHDL) or Verilog that configure connections between internal hardware modules with lesser functionality on a programmable device.

The processor module 106 is operatively coupled to one or more modules 130(a) . . . (n) where "n" is any suitable number via an associated interface or bus 126(a) . . . (n) where "n" is any suitable number.

The first module 110, which includes memory 102, processor 106 and related modules 130 (generally), is operatively coupled to a plurality of peripheral/auxiliary modules 114(a) . . . (n) (where "n" is any suitable number), via associated bi-directional interfaces or busses 112(a) . . . (n) (where "n" is any suitable number), respectively.

Peripheral/auxiliary modules 114 may be any I/O (input/output), computer peripheral, such as mouse, keyboard, printer, port, etc. or auxiliary memory or auxiliary processor that comports with system 100.

Figure 2:
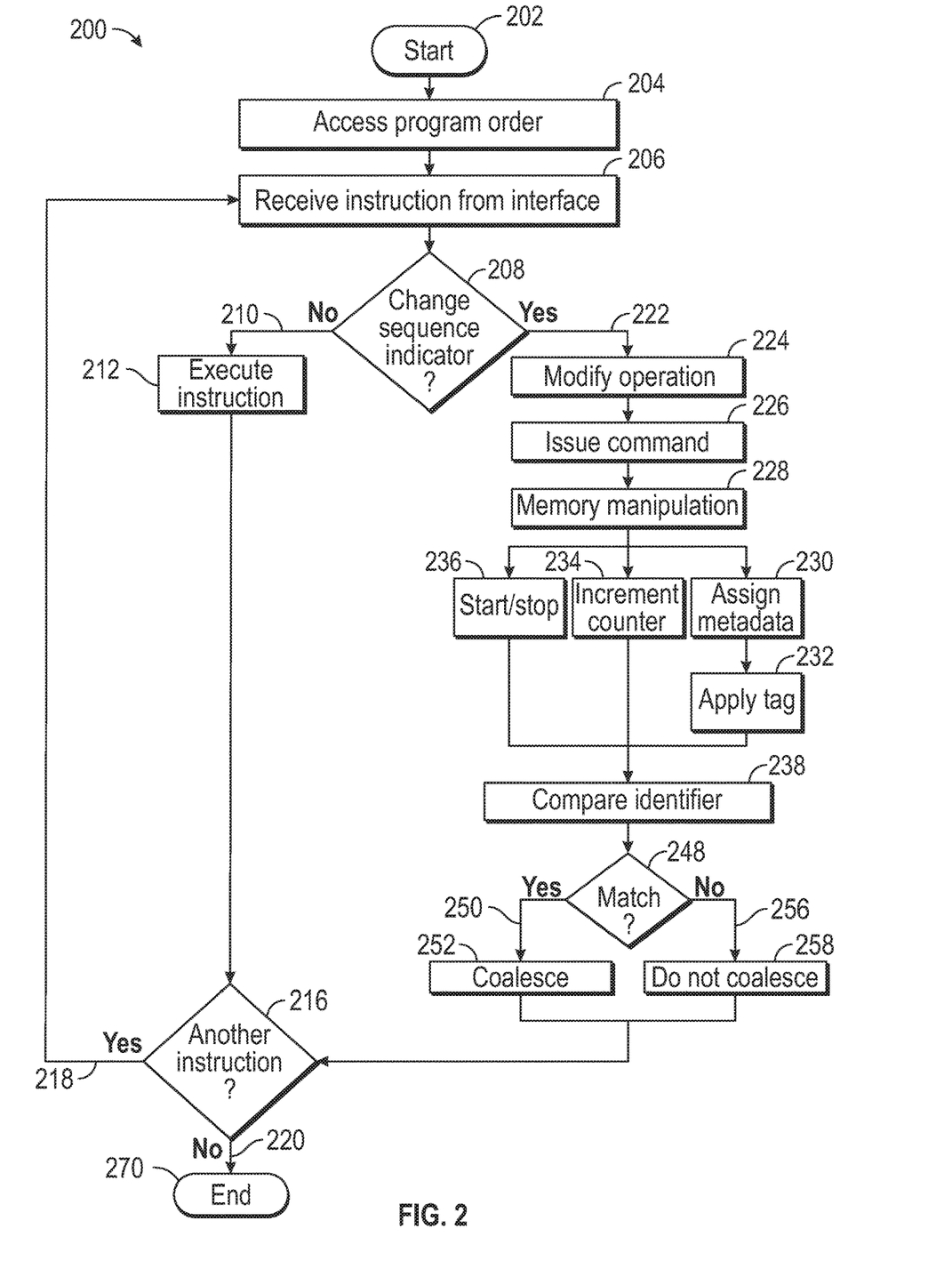
FIG. 2 illustrates an example of a flowchart that may be used in accordance with various representative embodiments.

FIG. 2 shows a flowchart 200 according to an embodiment. The series of actions 200 may be stored on non-volatile memory or other suitable memory or computer-usable medium and in any suitable programming language.

The series of actions shown in FIG. 2 may be stored in memory 102, as shown herein, and executed by processor 106, as shown herein.

As shown in FIG. 2, the algorithm, starts (202). A program order, or sequence is accessed (204). An instruction is received, or accessed, (206), typically via an interface. The instruction is evaluated to determine (208) if the instruction includes a group changing indicator, the indicator may be a mnemonic or "start/stop" command or notation. The group changing order indicator may be any one of a number of indicators. The group changing indicator modifies memory operation sequence. One embodiment includes indicators as a mnemonic that is a command, or metadata. Another embodiment is that the indicator is a start/stop indicator.

An instruction having the indicator is used to distinguish a distribution of operations by the memory. The distribution is typically based on the mnemonic or other identifier. This distribution of operations by the memory typically involves grouping operations so a first group of one or more first operations are distinct relative to one or more second operations.

Indeed, one embodiment is that the second operations may be an open group since those operations will be processed following the processing of the operations in the first group.

If a determination (208) is made that the instruction does not (210) include a sequence changing indicator, the operations are executed (212). Following the execution of operations (212) a determination is made (216) whether there is another instruction. If so, (218) the next instruction is received (206) typically from an interface. If there are no nor instructions, the algorithm ends (270).

If a determination (208) is made that there is a sequence modifying indicator (222) as part of the instruction received, the program operation sequence is modified (224). A command (226) is issued to do any of the following: stop; start; insert a barrier; or otherwise modify the sequence of operation, depending on the type of sequence modifying indicator, or command associated therewith. The indicator may or may not actually perform any command control functionality, but merely act as a pointer. For example, "SEP" may not perform any memory function, but simply updates a counter so subsequent memory operations get a different metadata tag.

The program sequence is modified, which can be generally a memory manipulation (228). This memory manipulation or modification may include, for example, coalescing certain instructions, preventing coalescing of certain instructions, starting execution, stopping execution or any other revision or change in an order of execution of instructions or other memory operations.

At this point in the algorithm, there are a number of different embodiments that can be implemented. One embodiment is that a metadata tag, or value is assigned to a memory operation (230). This metadata tag or value could be considered a phase color or ordering tag, or unsigned integer assigned from a counter, such as a monotonically increasing counter. The tag is then applied to the memory operation (232).

Additionally, as stated above, the value may be an unsigned integer assigned, for example, by a monotonically increasing counter (234). In this embodiment, SEP does not actually perform any memory function and simply serves to increment the counter so that subsequent memory operations are assigned a different metadata tag. As such, this tag can be applied as early as immediately subsequent to the decode stage. Thus, SEP does not enforce ordering, thereby allowing multiple memory operations after the SEP to execute and be coalesced before the SEP is committed. In this embodiment, the buffering stage, or MEM stage, will only coalesce memory operations with the same metadata tag. This satisfies the desired semantics, but SEP does not need to generate micro-ops, or be re-named, or issued or executed.

In yet another embodiment, a "start/stop" command may be recognized in a pipeline fashion (236). In this pipeline processing, the command is used to distinguish a boundary condition. This boundary condition is used to manipulate processing sequence or order and can be used to identify, or serve as a barrier instruction.

Regardless of whether there is a tag (232), a counter (234) or a command (236), a comparison (238) is made of the identifier (232), (234), (236) to a predetermined criteria or other metric. For example, when metadata tags are used, the metadata tag of one operation can be compared to the metadata tags of another operation. Additionally, the counter value of one operation can be compared to the counter operation of another operation. Furthermore, the command "start" or "stop" can be identified as either starting an operation or stopping an operation.

Depending on the result of the comparison (238) a determination of a match, or actuation or function is made (248). If it is determined that there is a match, or that there is no barrier, memory coalescing can occur (252). If there is no match, or there is a barrier, memory coalescing does not occur (258).

After the operations are executed, whether coalesced (252) or not coalesced (258), the operations can be renamed.

A determination is made whether there are further instructions (216). If so, (218) the next instruction is received (206) typically from an interface. If there are no nor instructions, the algorithm ends (270).

Figure 3:
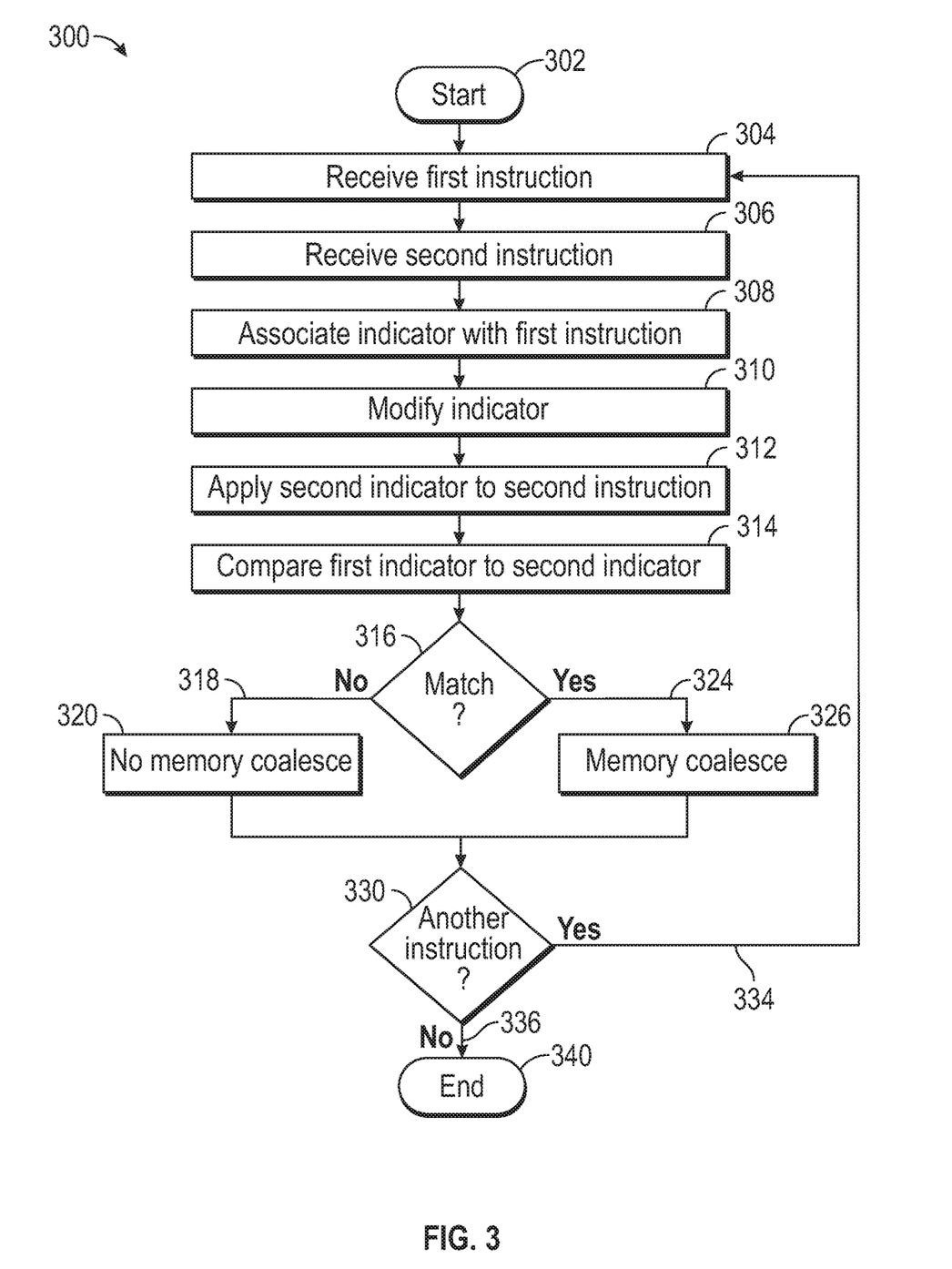
FIG. 3 illustrates an example of a flowchart that may be used in accordance with various representative embodiments.

FIG. 3 shows an exemplary algorithm or flowchart 300 that may be used according to an embodiment of the disclosure. The flowchart 300 may be stored on non-volatile memory or other suitable memory or computer-usable medium and in any suitable programming language.

The algorithm starts (302) and a first instruction is received (304), typically at a processor via an interface. A second instruction is received (306), typically at the processor via an interface. An indicator is associated with the first instruction (308). Typically, this indicator could be metadata, metadata tag, metadata value, command ("start/stop") or incremental value.

The indicator that is associated with the first instruction may be modified, or updated or changed (308) so that the new indicator is associated with the second instruction (312). It is an embodiment that the first indicator will be the same as the second indicator in some instances. Indeed, the indicator that is associated with the second instruction may be such that it shows a match between the type of instruction that the first instruction is and the type of instruction the second instruction is.

The use of an indicator associated with the first instruction and an indicator associated with the second instruction is such that the indicators can be compared, or analyzed, (314) to determine whether a barrier instruction is present or whether an indicator causes a change in the program sequence, or change in the order of execution of operations.

The comparison is used to determine whether the indicators match (316) or otherwise show if the order of execution should be changed. If the result of the determination (316) is that the indicators do not match, or that there is an execution modifying identifier, (318) then the memory operations are not coalesced (320).

If the result of the determination (316) is that the indicators match, or that there is not an execution modifying identifier (324), then the memory operations are coalesced (326).

Following either memory coalescing (326) or no coalescing (320), the indicator may be re-named for subsequent instructions.

A determination is made whether there are more instructions (330) and if so (334), shows that another instruction is received (304). If there are no further instructions (336) then the algorithm ends (340).

Figure 4:
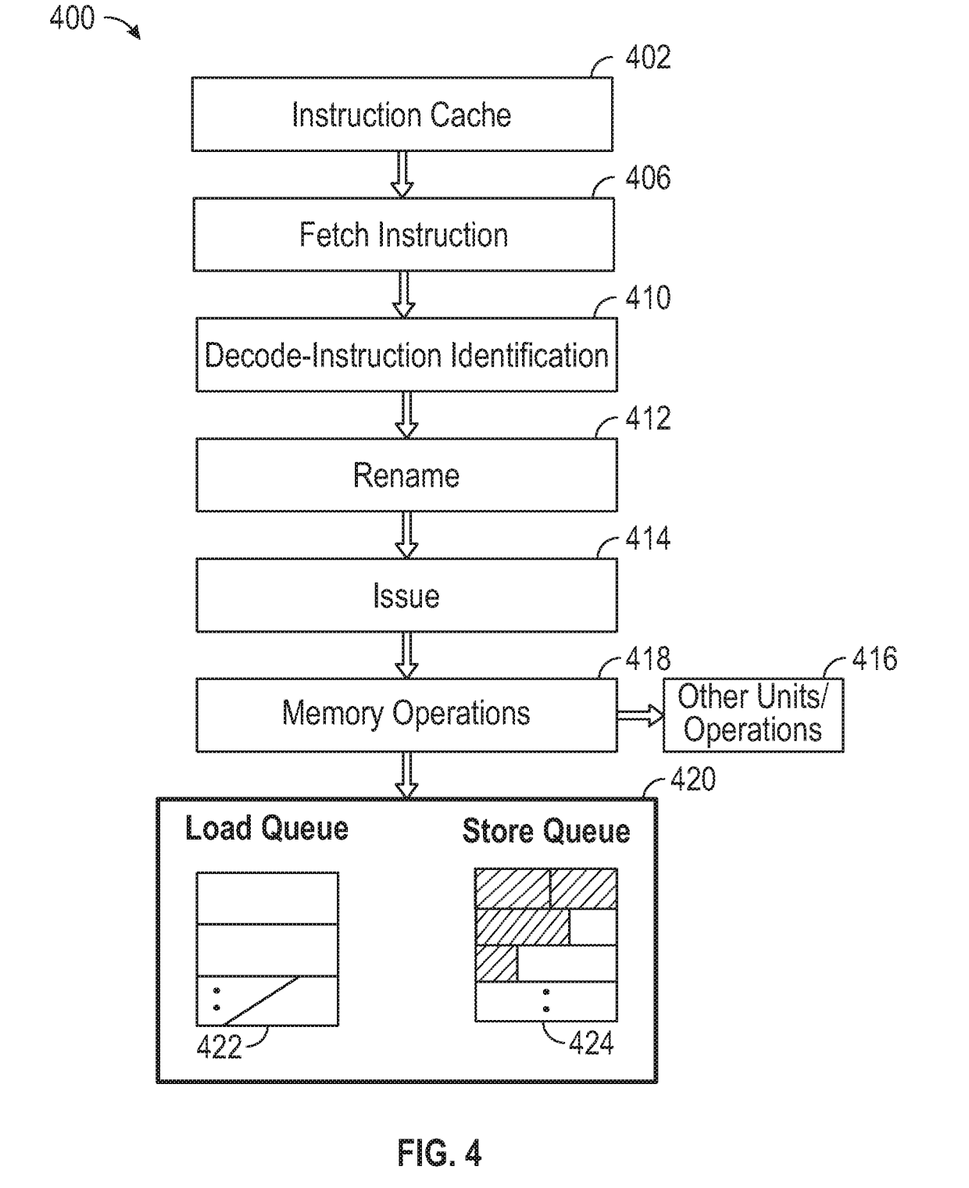
FIG. 4 shows an example of a flowchart that may be used in conjunction with hardware in accordance with various representative embodiments.

FIG. 4 shows a flowchart with reference to hardware components to implement an embodiment. The elements of FIG. 4 are collectively shown as 400, the components of which may be utilized in a computer processing environment of hardware, memories, processors, peripheral, auxiliary components, interfaces and software. The software can be stored on non-volatile memory or other suitable memory or computer-usable medium and in any suitable programming language.

FIG. 4 shows that an instruction cache can be accessed (402). This instruction cache can be a storage module, memory, or any suitable electronic storage medium, which may be local or remote. The instruction cache stores a plurality of instructions.

Upon accessing the instruction cache, an instruction is fetched (406). This instruction could be any desired instruction to be used by a processor, memory, or combination thereof.

The instruction is decoded (410). The decoding of the instruction can be used to parse various aspects of the instruction, such as an indicator, mnemonic, metadata tag, metadata value, counter value, command (start/stop) or any other usable information associated with the instruction for identification purposes. The identification facilitates determination of whether the instruction includes an indicator that the program order or execution sequence should be modified.

Once the instruction has been decoded and identified, it is re-named (412). The re-naming is performed to maintain control of those instructions that have been issued or executed. This re-naming ensures that subsequent memory operations get a different indicator, such as different metadata tag or different command.

The instruction is then issued (414) to implement the execution of the operation. Following issuance of the instruction (414), other units or operations can be accessed (416).

Memory operations are performed (418). These memory operations may be modified based on the indicator or instruction decoded (410). Typically the memory operations access a memory module (420), which may include load queue module (422) and store queue module (424). Other memory registers or sub-modules may also be located in memory module (420).

Figure 5:
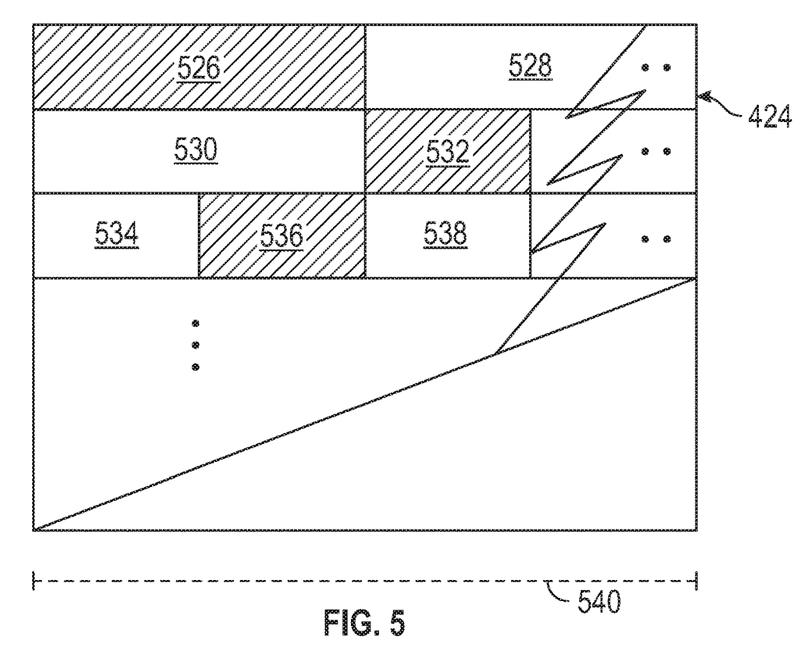
FIG. 5 shows an example of a buffer in accordance with various representative embodiments.

FIG. 5 shows the store queue (424) in more detail. The store queue (424) may be, for example, buffer, such as a Write-Combining Buffer (WCB), and includes a number of registers, or storage areas, or memory locations, which can be accessed. While one buffer 424 is shown and described herein, it is within the scope of this disclosure that the system may have any suitable number of buffers, including a plurality of WCBs.

Figure 6:
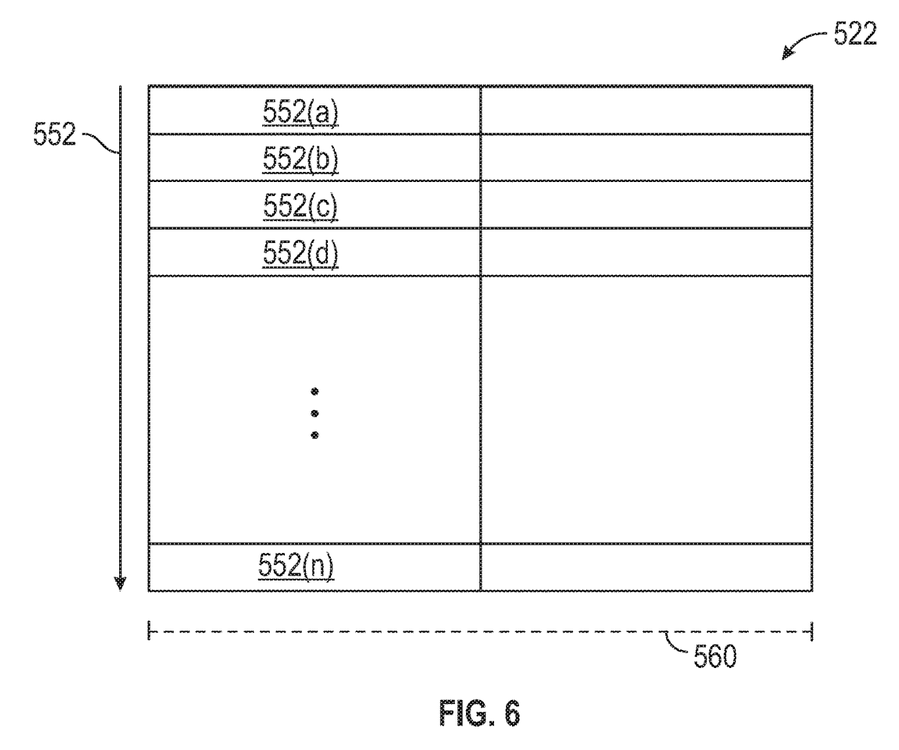
FIG. 6 shows an example of a memory module in accordance with various representative embodiments.

FIG. 6 shows a data cache memory module 522, which is operatively coupled to the store queue 424 such that the store queue 424 can access data from cache module 522. The data cache module 522 holds data and has access to buffers and storage locations.

In one embodiment, the store queue 424 may be a WCB, which is a weakly ordered memory type. The WCB may be operatively coupled to data cache module 522. This allows the WCB to react more quickly than slower control messages. The WCB may be mapped allowing each WCB to operate independently of other WCB buffers within a processor, or CPU core. Utilization of a WCB permits data to be combined and temporarily stored in and then the data maybe released together instead of writing (immediately) as single bits or small chunks.

As shown in FIG. 5, memory registers of buffer 424 have storage allocations 526, 528, 530, 532, 534, 536 and 538. These storage allocations are used to store data from cache 522, which has registers 552(a) . . . (n). The storage registers of buffer 424 may or may not have data stored therein. Indeed the storage locations of data in the buffer may be manipulated such that memory operations that can be coalesced are and when a barrier indicator, such as a command or tag is identified, the memory operations are not coalesced. The storage capacity dimension 540 of buffer 424 is shown. As show by buffer 424, the storage allocations 526, 528, 530, 532, 534, 536 and 538 can be smaller than the dimension 540.

FIG. 6 shows a representation of a data cache 522. This data cache 522 has sets, generally shown as columns 552, having sub-registers 552(a) . . . (n) (where "n" is any suitable number). The width dimension 560 of data cache 522 is shown. The data in registers 552 (generally) can be accessed and manipulated and stored in buffer 424. The data stored in buffer 424 can then be utilized in a burst, rather than a single bit, or smaller segment.

Figure 7:
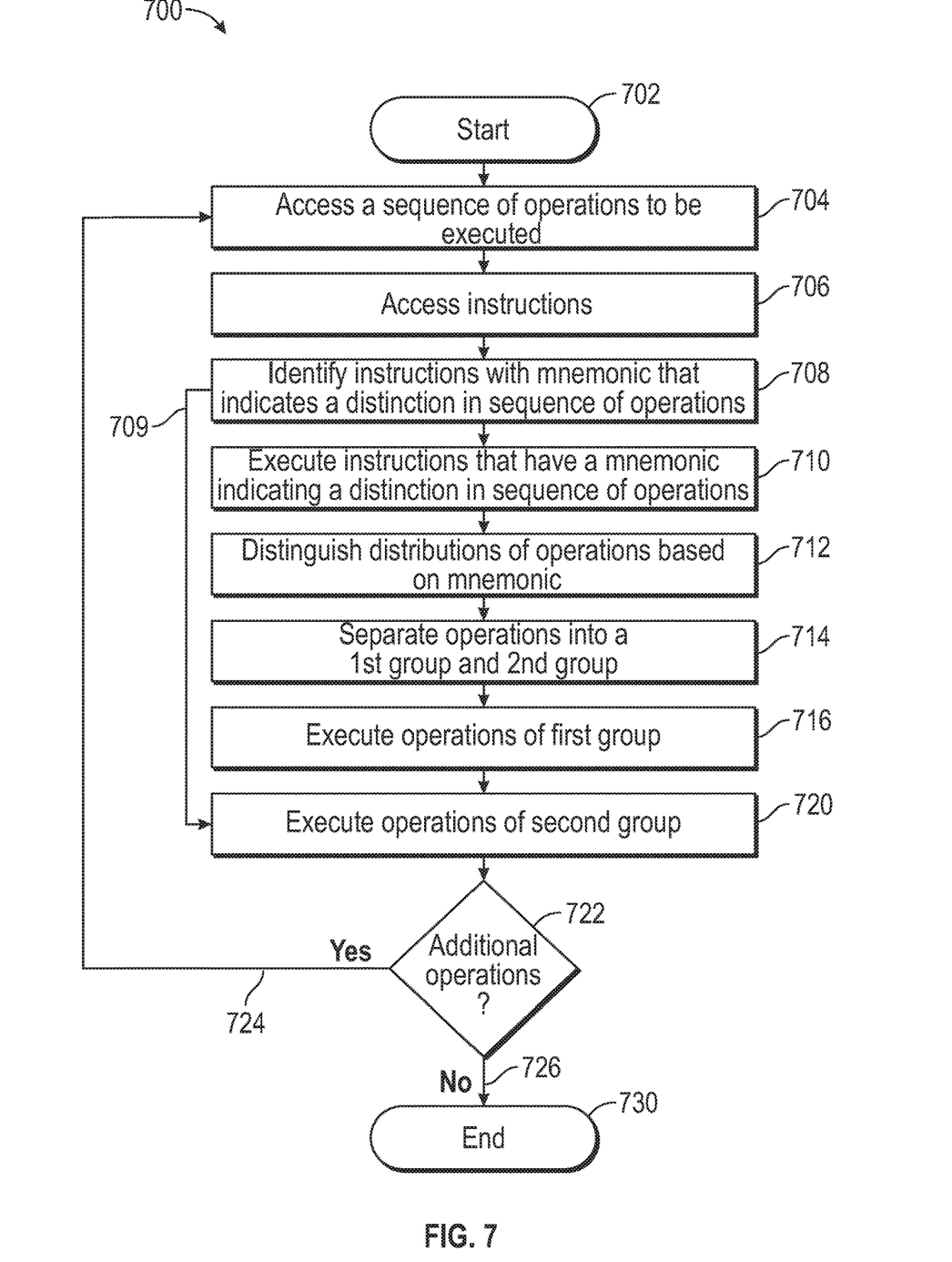
FIG. 7 shows a flowchart according to an embodiment.

FIG. 7 shows a flowchart 700 according to an embodiment. The series of actions 700 may be stored on non-volatile memory or other suitable memory or computer-usable medium and in any suitable programming language.

The series of actions shown in FIG. 7 may be stored in memory 102, as shown herein, and executed by processor 106, as shown herein.

As shown in FIG. 2, the algorithm, starts (702). A program order, or sequence of operations to be executed, is accessed (704). An instruction is received, or accessed, (706), typically via an interface.

The instruction is evaluated to identify (208) a group changing indicator, or a mnemonic that indicates a distinction in sequence of operations as part of the instruction. The indicator may be a mnemonic or "start/stop" command or notation. The group changing order indicator may be any one of a number of indicators. The group changing indicator may be used to modify memory operation sequence. One embodiment includes indicators as a mnemonic that is a command, or metadata. Another embodiment is that the indicator is a start/stop indicator.

An instruction having the indicator is used to distinguish a distribution of operations by the memory. The distribution is typically based on the mnemonic or other identifier. This distribution of operations by the memory typically involves grouping operations so a first group of one or more first operations are distinct relative to one or more second operations.

Indeed, one embodiment is that the second operations may be an open group since those operations will be processed following the processing of the operations in the first group.

If a determination (708) is made that the instruction does not include a sequence changing indicator, the operations are by default, assigned to a second group (709), which are executed (720).

When an instruction includes a mnemonic that indicates a distinction in the sequence of operations, the instruction is executed (710).

The distributions of operations are distinguished based on the mnemonic or the instruction having the mnemonic (712). The operations are separated, or segregated or grouped, based on the distinction (714). Typically, the separation will be into a first group that are not coalesced, or operations that are executed in a sequence based on the mnemonic. The second group, which may be an open group, may be coalesced. Alternatively, the first group could be distinguished for other processing operations, which may be unrelated to memory coalescing.

As shown in FIG. 7, the operations that were distinguished into the first group are executed (716). The operations in the second group are then executed (720).

A determination is made whether there are additional operations (722). If so, (724) the sequence of operations are accessed (704). If not, (726) the algorithm ends (730).

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if desired, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present disclosure may be written in any combination of one or more programming languages, including an object-oriented programming language such as Java, Smalltalk, C++, C # or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operations to be performed on the computer, or other programmable apparatus to produce a computer-implemented process such that the instructions which execute on the computer or other programmable apparatus, provide processes for implementing the functions/acts specified in the flowchart and/or block diagram block or blocks.

As will be appreciated by one skilled in the art, the embodiments can be described as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

It can be seen that the system and methodologies presented herein provide an advancement in the state of the art.

Accordingly, some of the disclosed embodiments are set out in the following:

One embodiment is directed to a method ("the Method") comprising: accessing, from a memory, a program sequence of operations that are to be executed; accessing one or more instructions, some of the one or more instructions having an associated mnemonic; identifying one or more instructions having a mnemonic that indicates a distinction in the program sequence of operations; executing the one or more identified instructions; and distinguishing distributions of operations by the memory, the distribution based on the existence of the mnemonic, that denotes a first group of one or more first operations relative to one or more second operations, the first group being distinct from the one or more second operations.

The Method further comprising assigning selected operations a metadata tag, based on the mnemonic.

The Method where the metadata tag determines the sequence of operations.

The Method where the metadata tag indicates a distinction in the distribution of operations.

The Method where the metadata tag includes a phase color.

The Method where the metadata tag includes an ordering tag.

The Method further comprising re-naming the mnemonic so subsequent operations have different metadata tag; and coalescing operations based on the metadata tag.

The Method where the mnemonic includes an integer.

The Method where the receiving one or more instructions comprises receiving instructions via an interface.

The Method further comprising modifying the mnemonic associated with one or more subsequent instructions or operations.

The Method further comprising executing one or more operations having a mnemonic after a previous instruction is executed; and coalescing one or more operations prior to executing an instruction having a mnemonic.

The Method where selected operations are executed independent of the mnemonic.

The Method further comprising coalescing memory operations based on a matching mnemonic.

The Method further comprising coalescing operations based on identified instructions independent of a mnemonic.

Another embodiment is directed to a method, comprising: receiving a first instruction that distinguishes memory access; accessing a second instruction accessing an incoming address; associating a first metadata value with the first instruction; implementing the first instruction by assigning to each memory operation a first metadata value; incrementing a counter such that subsequent memory operations are assigned to a second metadata value; applying the second metadata value to a next decoding stage; comparing first metadata value to the second metadata value such that: when the first metadata value matches the second metadata value, grouping the associated operations with matching metadata values; and when the first metadata value is different than the second metadata value, grouping the associated operations with non-matching metadata values.

The Method as described above where the second instruction provides access to memory operations having compatible metadata.

The Method as described above where the first instruction is assigned an executed state independent of execution, but as a function of grouping of other instructions.

The Method as described above where the first instruction controls memory access before the first instruction and memory access after the first instruction.

An apparatus, comprising: a memory; and a processor, coupled to the memory, that executes instructions stored in the memory, the instructions comprising: accessing, from a memory, a program sequence of operations that are to be executed; accessing one or more instructions, some of the one or more instructions having an associated mnemonic; identifying one or more instructions having a mnemonic that indicates a distinction in the program sequence of operations; executing the one or more identified instructions; and distinguishing distributions of operations by the memory, the distribution based on the existence of the mnemonic, that denotes a first group of one or more first operations relative to one or more second operations, the first group being distinct from the one or more second operations.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method comprising:
    accessing a sequence of memory operations to be executed;
    receiving a barrier instruction including a mnemonic that indicates a change in the sequence of memory operations;
    evaluating the barrier instruction to identify the mnemonic;
    executing the barrier instruction; and
    modifying the sequence of memory operations based on the mnemonic, including:
        separating the memory operations into a first group of non-coalesced memory operations and a second group of coalesced memory operations,
        executing the first group of non-coalesced memory operations, and
        executing the second group of coalesced memory operations after the first group of non-coalesced memory operations have been executed.

2. The method as claimed in claim 1, further comprising:
    assigning selected operations a metadata tag, based on the mnemonic.

3. The method as claimed in claim 2, where the metadata tag determines the sequence of operations.

4. The method as claimed in claim 2, where the metadata tag indicates a distinction in the distribution of operations.

5. The method as claimed in claim 2, where the metadata tag includes an ordering tag.

6. The method as claimed in claim 1, further comprising:
    re-naming the mnemonic so subsequent operations have different metadata tag; and
    coalescing operations based on the metadata tag.

7. The method as claimed in claim 1, where the mnemonic includes an integer.

8. The method as claimed in claim 1, where the receiving one or more instructions comprises receiving instructions via an interface.

9. The method as claimed in claim 1, further comprising:
    receiving a subsequent instruction including a mnemonic; and
    modifying the mnemonic of the subsequent instruction.

10. The method as claimed in claim 1, further comprising:
    executing one or more operations having a mnemonic after a previous instruction is executed; and
    coalescing one or more operations subsequent to executing an instruction having a mnemonic.

11. The method as claimed in claim 1, where selected operations are executed independent of the mnemonic.

12. The method as claimed in claim 1, further comprising:
    coalescing memory operations based on a matching mnemonic.

13. The method as claimed in claim 1, further comprising:
    coalescing operations based on identified instructions independent of a mnemonic.

14. The method as claimed in claim 1, where the mnemonic is a name, an identifier or a code.

15. The method as claimed in claim 14, where the barrier instruction is not a memory operation, and the mnemonic is a name, and the barrier instruction increments a monotonically increasing counter that is used to assign an order tag to each memory operation in the sequence of memory operations.

16. The method as claimed in claim 15, where the mnemonic name is separation (SEP).

17. An apparatus, comprising:
    a memory; and
    a processor, coupled to the memory, configured to:
        access a sequence of memory operations to be executed;
        receive a barrier instruction, having a mnemonic that indicates a change in the sequence of memory operations;
        evaluate the barrier instruction to identify the mnemonic;
        execute the barrier instruction; and
        modify the sequence of memory operations based on the mnemonic, including:
            separate the memory operations into a first group of non-coalesced memory operations and a second group of coalesced memory operations,
            execute the first group of non-coalesced memory operations, and
            execute the second group of coalesced memory operations after the first group of non-coalesced memory operations have been executed.

* * * * *